April 20, 1948.  F. W. ADAMS  2,439,999
PROCESS OF FORMING FILMS UPON THE SURFACES OF GLASS PLATES
Filed Dec. 9, 1944
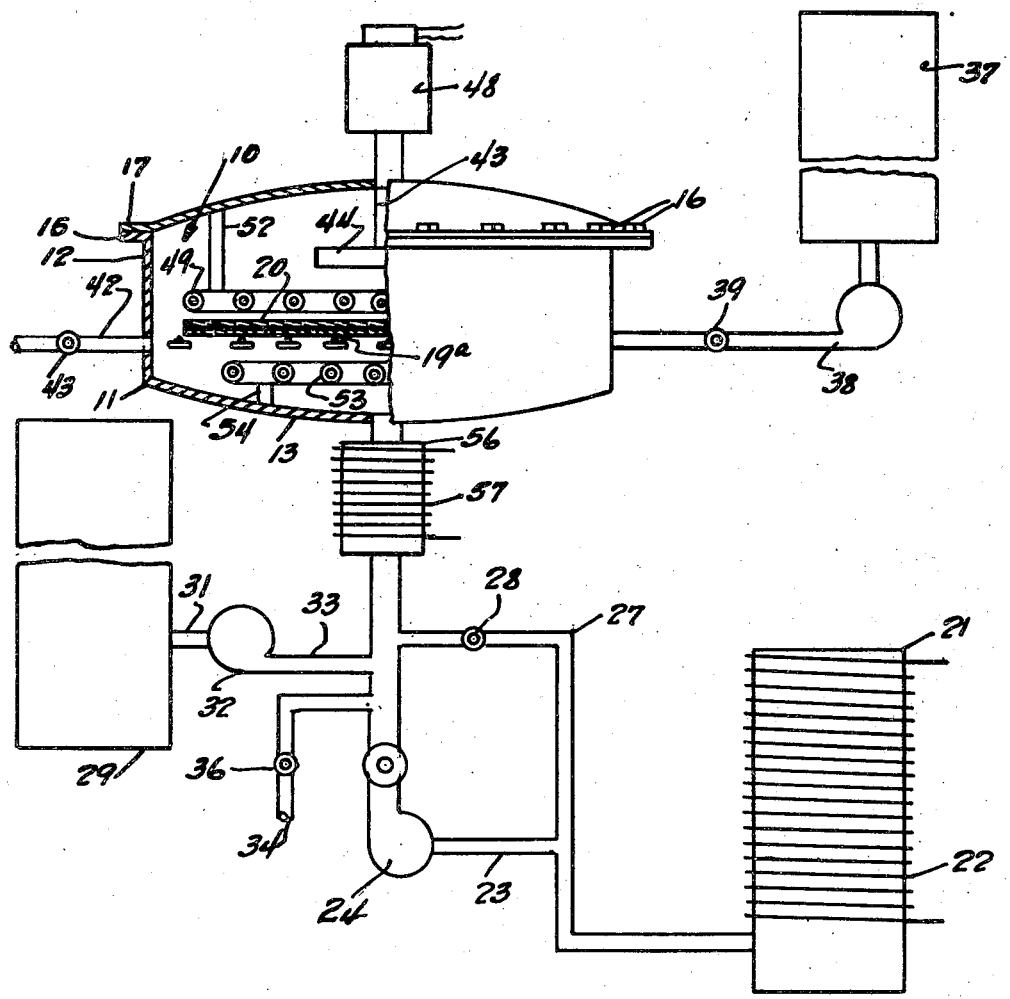
Inventor
FREDERICK W. ADAMS
By Olen E. Bee
Attorney Patented Apr. 20, 1948

2,439,999

UNITED STATES PATENT OFFICE 2,439,999

PROCESS OF FORMING FILMS UPON THE SURFACES OF GLASS PLATES

Frederick W. Adams, New York, N. Y., assignor to Pittsburgh Plate Glass Company, Allegheny County, Pa., a corporation of Pennsylvania Application December 9, 1944, Serial No. 567,439

10 Claims. (Cl. 154—2.73)

The present invention relates to the etching of glass surfaces to provide thin films thereupon, and it has particular relation to the provision of films designed to resist the action of moisture or other chemical agencies, or to eliminate or reduce reflection from the surface of the plates.

One object of the invention is to provide upon glass surfaces very thin and uniform films designed to protect the latter from chemical action without appreciably altering the appearance or the optical properties of the surface.

A second object of the invention is to provide films upon the surface of glass which are highly uniform in character and are of such thickness and density as substantially to reduce reflection in the visible light range from the surfaces of glass plates.

A third object is to provide a simple and economical process of forming such films.

Two well recognized objectionable features of glass surfaces involve:

Firstly, a tendency for certain of the constituents, e. g., the calcium compounds to dissolve or leach out moisture condensed upon the surface to produce so-called scum or discoloration. This feature is especially bad in double-glazed windows where access for cleaning can not readily be had with the inner surfaces. Moisture penetrates the units, condenses on the surfaces, takes up soluble constituents and evaporates, leaving first, a concentrated solution; then finally, the moisture film evaporates relatively completely. This is repeated over and over until the surface becomes noticeably overcast with a so-called scum.

Secondly, by reason of a difference in refractive index between the glass and the atmosphere, there is a tendency for the glass to reflect a portion of the light striking, thus obscuring vision, and reducing illumination passing through the glass.

It has heretofore been proposed to form thin films upon the surfaces of glass plates by etching the latter with acid, such as nitric acid or hydrofluoric acid for a short period of time. In this way, the more soluble constituents of the glass, such as alkalies, e. g., sodium or potassium oxide, calcium oxide, magnesium oxide and the like are dissolved out by the acid to a sufficient degree to leave a thin film highly rich in silica and probably of rather low density. By proper control of the concentration of acid and the period of exposure of the surface to the acid, it is possible so to control the thickness of the film as approximately to equal one quarter of the wave length of some predetermined portion of the spectrum of light. Usually, a quarter of the wave length of D sodium light is selected as the measure of film thickness. This wave length is approximately in the middle of the visible spectrum and is the one to which the eye is most sensitive. These films have an index of refraction substantially different from that of the untreated glass, so that a multiple reflection from a glass surface is obtained. Therefore, the light waves reflected from the outer surface of the film are opposed in phase to those reflected from the surface of the glass beneath the film, and the two reflections of yellow light tend to cancel each other and thus more or less completely extinguish visible reflection from the plate.

It is a characteristic of conventional films obtained by etching the surfaces of glass plates that they are of but low alkali metal content, but still contain considerable amounts of alkali earth metal compounds, such as calcium oxide. This is because the latter are much less soluble and reactive than alkali metal compounds. The alkali earth metal compounds substantially reduce the durability and chemical resistance of the films.

In accordance with one feature of the present invention it is proposed to form films upon the surfaces of glass under such conditions that the rate of solution of alkali metal compounds is greatly reduced while the rate of solution of alkali earth metal compounds is not correspondingly slowed up. In this way, it becomes possible to form films consisting of almost pure silica.

The resultant films can be hardened by a mild baking operation, are very hard, durable and uniform and are excellently adapted to use either as protective films for the glass surface or as reflection reducing agencies.

In accordance with the provisions of the present invention a glass body, the surface of which is to be etched, may comprise substantially any conventional glass composition, such as optical glass of the type of crown glass, flint glass, or the like, or it may comprise glasses, such as window glass and glasses employed in the manufacture of bottles and other receptacles, which contain primarily silica, lime and soda-ash in suitable proportions. Usually, the glass will be transparent rather than translucent, and will be in vitreous homogeneous state.

In the formation of a protective or a reflection reducing film upon the surface of such glass, the body, e. g., a plate, lens, or mirror may be introduced into an autoclave or other suitable pressure receptacle and there subjected to the action of a hot aqueous solution of common salt or other sodium salt, e. g., sodium nitrate at an elevated pressure. A typical working temperature for use in the process would be about 200° C., though higher and lower temperatures may be employed. The working pressure of the autoclave will be about 200 to 300 pounds per square inch. The concentration of the salt solution preferably is about half normal, but may be varied in accordance with the composition of the glass being treated and other factors, to effect optimum results.

In order to form a film which is chemically resistant and resistant to the common agencies of stain, such as moisture and the like, the film may be exceedingly superficial, so superficial as not appreciably to effect the optical properties of the body.

For example, it may be of a thickness of about 3 to 6 millionths of an inch. When the glass is sufficiently etched, which process usually requires about 5 to 20 minutes, the etching action is stopped, for example, by removing the glass from the etching bath or by draining away the bath. The glass may then be washed in order to remove any excess of salts clinging thereto and finally it is hardened by baking it at a moderate temperature, e. g. 200° C. for a few minutes, e. g. about 10 or 15 minutes, to drive off water of hydration. This baking action may be accomplished by leaving the heated bodies in the autoclave after the salt solution has been drained and the plates have been washed. In event that the temperature is not sufficient at that time to effect adequate baking, hot, dry gases, such as hot air may be introduced into the autoclave to obtain the desired results. In baking operation, the pressure in the autoclave may be subnormal, normal, or if preferred the gases may actually be under substantial pressure.

Sometime it may be desirable in the foregoing process to add an acid to the salt etching solution. A suitable acid would be hydrochloric acid or nitric acid, which may be added in amounts for example sufficient to obtain an acid value of ½ to 1 normal, or even more or less.

If the treatment of the glass in the foregoing process is continued for a sufficient period of time, it is possible to increase the depth of the film to a substantial degree. For example, it may be continued until the film is approximately ¼ of the wave length of D sodium light in thickness. This corresponds approximately to a film of 12 millionths of an inch. The films are highly rich in silica, but much of the calcium and alkaline earth compounds in the glass are etched away to provide a film of low density or porous character having a refractive index sufficiently different from that of the glass body as to produce cancellation of much of the light normally reflected from the glass surface by interference.

In a typical process designed to provide a non-reflecting glass surface, a flat plate of glass, such as a plate of window glass, was immersed in a water solution of 2 normal hydrochloric acid and 1 normal sodium chloride in an autoclave where it was subjected to temperatures in about a range of 150 to 200° C. and under corresponding pressures. This treatment may be continued until a bluish or brownish color indicative that the film is of such thickness as to effect cancellation of the yellow light by interference has been reached. After the sodium chloride-hydrochloric acid has been drained off from the plate the latter may be washed and then heated for a few minutes, if desired in the autoclave.

If films having very low reflection losses are desired, the surfaces may be etched in two stages, first with a strong acid such as hydrochloric acid containing a salt such as NaCl, and being designed to remove alkali and alkali earth metal compounds. Subsequently, the films are opened up by etching out some of the silica in a brief treatment with hydrofluoric acid. This process is disclosed in detail in Patent No. 2,348,704 issued to me on May 16, 1944.

It is, also, possible to etch the surface of glass bodies, such as bodies of borosilicate glass, with vapors of boron fluoride or with mixed vapors of boron chloride and boron fluoride. In this process, bodies of glass, e. g. plates, are subjected to an autoclave at a temperature of about 150 to 250° C. until the surface is etched to a depth within a range of about 3 to 12 millionths of an inch. The bodies are washed with water. Subsequently, they may be baked at about 300 or 400° C. or below to harden the films.

If desired, the films may be fortified by the introduction of metallic salts, such as aluminum chloride or beryllium chloride into the salt-acid solution. For example, a small amount of aluminum chloride as an acid solution may be added to the sodium chloride treating solution. The treated plates are washed and baked at a temperature below about 400° C., in order to harden the surfaces. It would appear that some of the aluminum or beryllium compound in the treating solution actually enters into the film where it is bound or held by chemical or physical action in such manner as substantially to increase the toughness and durability of the film. If it is desired to provide a non-reflecting surface instead of one merely resistant to staining and chemical action beryllium chloride as the fortifying agent is particularly desirable.

The absorption of alkali earth metal compound, such as calcium from glass surfaces may be promoted without correspondingly increasing alkali metal solution by addition of solubilizing agents for calcium, such as common sugar, hexametaphosphate, or the like. These may be added to the aqueous salt solutions or to salt and acid solutions. The solutions can be applied to the glass in an autoclave and at an elevated temperature (150° C. or more) or at atmospheric pressures and at a temperature of 100° C.

In case it is desired to form a stain resistant or non-reflecting laminated glass, a sandwich comprising plates of glass, such as ordinary lime soda glass, either polished or unpolished, with an intermediate binder, such as a sheet of vinyl butyral containing about 30 to 33 percent of a plasticizer, such as 2-ethyl triethylene glycol butyrate may be subjected to heat and pressure in an autoclave in direct contact with the salt solution. In this operation, the temperatures of 200° C. and the corresponding pressures for the liquid medium may be employed. The treatment may be continued for a period of 2 to 20 minutes, in order to etch the surface of the plates to a sufficient degree, to provide protective films or non-reflecting films whichever is desired. The salt solution is drained off or the plates are removed from the autoclave, whichever is preferred. Subsequently, the plates preferably while still warm are washed and then baked for about 10 minutes at a temperature of about 200° C. The baking operation may be accomplished by blowing heated air into the autoclave at an appropriate temperature. As a result of this treatment the plastic is adhered to the glass to provide safety glass, which is conventional in construction except that it further includes surface films designed to obviate stain or reflections or both.

A simple form of apparatus suitable for use in practicing the invention is illustrated diagrammatically in the single figure of the drawing. The apparatus comprises an autoclave 10 of appropriate size and shape and comprising a receptacle 11 with side wall 13 and bottom 14. The receptacle is provided about its upper edge with a flange 15 secured by bolts 16 to a corresponding flange 17 of a cover 18. A grid 19 in receptacle 11, having points 19a, supports glass plate 20 in position to afford thorough exposure of the faces to fluids employed for etching, etc.

Etching fluid is contained in a receptacle 21 provided with a heating coil 22 and having conduit connecting it with the autoclave. A pump 24 in the conduit functions as lifting means for the fluid. In order to maintain the fluid in the autoclave, valve 26 may, also, be provided in the line. Line 27 having valve 28 constitutes a bypass for the pump permitting the etching fluid to return by gravity to tank 22 at the conclusion of the etching operation.

Washing fluid for the glass plates is contained in receptacle 29 and is connected by conduit line 31 to the conduit 23. The line 31 is, also, provided with pump 32 and a valve 33 by means of which the flow of washing fluid can be controlled. Discharge of spent fluids can be effected through a line 34, joined to conduit 23 and having a valve 36 for opening and closing the line.

Drying and baking of the plate after it has been etched and washed may be effected by hot air from a heater 37 connected by conduit 38 to the autoclave. A valve 39 prevents the escape of liquids through conduit 38 and a pump 41 maintains flow of heated gases during drying and baking. Spent gases are discharged from the autoclave through line 42 having valve 43.

Circulation of gases and/or liquids in the autoclave is maintained, if desired, by a fan or agitator 44 upon a shaft 46 extending through a sleeve 47, sealed at opposite ends respectively in an opening in cover 18 and to the casing of a motor 48 driving the shaft.

Drying and baking of the plate 20 may be assisted by radiant heaters, such as electrical resistance elements 49, in protective tubes 51. These may be suspended by suitable hangers 52 carried by the cover 18. A similar set of radiant elements 53 may also be supported below the grid 19 upon brackets 54 attached to bottom 13.

Since the etching fluid may be employed in the autoclave at temperatures substantially above 100° C. a heater 56 in line 23, provided with heating means, such as coil 57, may be desirable. The fluid after it is brought under pressure by pump 24 can then be heated to substantially any operating temperature before it is introduced into the autoclave.

Operation of the apparatus is self-evident. A plate 20 is merely deposited upon grid 19, and the cover 18 positioned and secured. The valves 28, 33, 36, 39 and 43 are closed and valve 26 is opened, pump 24 is then started to flood the autoclave with etching solution at desired temperature and pressure. When the glass is sufficiently etched, the valve 28 is opened and the solution is allowed to drain back to receptacle 21. Subsequently, valve 26 is closed, valve 33 is opened and the chamber is flooded with hot wash water. Spent wash water is drained off through line 34. When the glass is washed, valve 33 is closed and the autoclave drained. Valves 39 and 43 may be opened to discharge hot gases through the autoclave for drying and baking plate. This operation may be assisted by the radiant heaters 50 and 53. Circulation of gaseous or liquid fluids in the autoclave is promoted by agitator 44.

It is of course apparent that etched plates, each of which has one or both surfaces treated in accordance with the provisions of the present invention, may be laminated with sheets of vinyl butyral plastics, such as are employed in the fabrication of safety glass with etched surfaces in actual contact with the plastic sheet. The etched surfaces are designed to provide an enhanced bond with the plastic by reason of the porous character of the surface.

It will be apparent that plates of glass having one or both surfaces etched in such manner as to reduce reflection may be employed in the fabrication of mirrors. In the latter operation, a silver or aluminum film may be deposited upon the etched surface by conventional methods, such as anodic sputtering, or by the action of reducing agents on solutions of silver compounds. The etched surface is again designed to provide an increased bond with the mirror film.

The plane surface of the mirror, i. e., the surface having any reflective film thereon may, also, be etched in such manner as to provide a film designed to eliminate or reduce reflection from the plane or uncoated surface. Mirrors of this type would be excellently adapted for use as rear view mirrors for use in automobiles and other vehicles where the elimination of ghost images, due to front or plane face reflection, is desirable.

Plates of window glass etched in accordance with the provisions of the present invention are particularly adapted for use in double glazed window units already referred to. If the inner surfaces of the glass plates are etched in accordance with the present invention, the tendency to form stain or scum in the double glazed units is eliminated or reduced. The outer surfaces of the plates may also be etched to such degree as to increase durability and resistance to stain, or even to such extent as to eliminate or reduce reflection.

I claim:

1. A process of forming safety glass having superficial films of high silica content upon the exposed surfaces thereof, which process comprises assembling a plurality of glass plates containing calcium oxide, silica and sodium oxide as components, with sheets of plastic as a binder between each two plates of glass, placing the resultant sandwich in an autoclave filled with an aqueous solution of a sodium salt at the laminating temperature for the plastic and at a corresponding pressure until the plates are adhered together and the exposed surfaces of the plates are etched preferentially to remove calcium to a depth of about 3 to 12 millionths of an inch, then removing and drying the assembly.

2. A process of forming safety glass having superficial films of high silica content upon the exposed surfaces thereof, which process comprises assembling a plurality of plates of glass comprising silica, an alkali earth metal and an alkali metal as components, with sheets of bonding plastic between each two plates, placing the resultant sandwich in an autoclave filled with an aqueous solution of salt of the alkali metal constituting a component of the glass at the laminating temperature, until the plates are adhered together and the surfaces are etched to a depth of about 3 to 12 millionths of an inch, draining the aqueous solution, washing the surfaces and baking the assembly in an autoclave in a relatively dry atmosphere to harden the film.

3. A process of forming safety glass having superficial films of high silica content upon the exposed surfaces thereof, which process comprises assembling a plurality of glass plates containing calcium oxide, silica and sodium oxide as components, with a sheet of vinyl acetal plastic as a binder between each two plates of glass, placing the resultant sandwich in an autoclave filled with an aqueous solution of sodium salt at a temperature of about 200° C. until the plates are adhered together and the exposed surfaces of the plates are etched preferentially to remove calcium to a depth of about 3 to 12 millionths of an inch, then removing and drying the assembly.

4. A process as defined in claim 9 in which the pressure in the autoclave is that corresponding to the vapor pressure of the aqueous solution.

5. A process as defined in claim 9 in which the sodium salt is of a group consisting of sodium chloride and sodium nitrate and the pressure of lamination is that corresponding to the vapor pressure of the aqueous solution.

6. A process as defined in claim 8 in which the alkali metal of the glass and the salt in the aqueous solution is sodium.

7. A process of forming safety glass having superficial films of high silica content upon the exposed surfaces thereof which process comprises placing a sandwich consisting of a plurality of plates of glass containing calcium oxide, silica and sodium oxide as components and a sheet of plastic as a binder between each two plates of glass, in an autoclave filled with an aqueous solution of a sodium salt at the laminating temperature for the plastic and at a pressure corresponding to that generated by the temperature until the plates are adhered to the plastic and the exposed surfaces of the plates are etched preferentially to remove calcium to a depth of about 3 to 12 millionths of an inch and then removing and drying the assembly.

8. A process of forming safety glass having superficial films of high silica content upon the exposed surfaces thereof which process comprises placing in an autoclave a sandwich comprising a plurality of plates of glass composed of silica and alkali earth metal and an alkali metal as components, with sheets of bonding plastic between each two plates, the autoclave being filled with an aqueous solution of a salt of the alkali metal constituting a component of the glass at the laminating temperature until the plates are adhered to the plastic and the surfaces are etched to a depth of about 3 to 12 millionths of an inch, draining the solution and washing the surface and making the assembly in an autoclave in a relatively dry atmosphere to harden the films.

9. A process of forming safety glass having superficial films of high silica content upon the exposed surfaces thereof which process comprises placing an assembly consisting of a plurality of glass plates containing calcium oxide, silica and sodium oxide as components and a sheet of vinyl acetal plastic as a binder between each two plates of glass in an autoclave filled with an aqueous solution of sodium salt at a temperature of about 200° C. until the plates are adhered to the plastic and the exposed surfaces of the plates are etched preferentially to remove calcium to a depth of about 3 to 12 millionths of an inch, then removing and drying the assembly.

10. A process as defined in claim 9 in which the plastic is polyvinyl butyral.

FREDERICK W. ADAMS.

REFERENCES CITED

The following references are of record in the file of this patent:

UNITED STATES PATENTS

| Number | Name | Date |
|---|---|---|
| 2,215,039 | Hood | Sept. 17, 1940 |
| 2,299,827 | Koester | Oct. 27, 1942 |
| 2,337,460 | French | Dec. 21, 1943 |
| 2,348,704 | Adams | May 16, 1944 |